June 23, 1964  M. T. BOWERS  3,137,961

COLLAPSIBLE FISHING FLOAT

Filed June 19, 1961

MARVIN T. BOWERS,
INVENTOR.

BY Donald E. Windle.
ATTORNEY.

3,137,961
COLLAPSIBLE FISHING FLOAT
Marvin T. Bowers, 3707 North Drive, Greenville, Ohio
Filed June 19, 1961, Ser. No. 117,951
2 Claims. (Cl. 43—43.1)

I am fully aware that fishing floats, as such, are old in the art. However, the conventional types of floats are rigid and require considerable space when stored in a tackle box. Further, with the conventional types of floats or devices, it is necessary to untie the fishing line from the device before the float can be stored in a tackle box.

The principal object of the present invention is the provision of a float which is extendable for use, and which is collapsible for storage purposes.

A second object is the provision of a collapsible fishing float having removable end members providing means for securing a fishing line thereto.

A third object is the provision of a collapsible fishing float which provides a pair of closed air spaces when in extended and operative condition.

A further object is the provision of an article of manufacture which is simple of construction and economical to manufacture.

Further objects and particular advantages of the invention will become more apparent in the course of the following description, and that which is new will be pointed out in the appended claims.

In order that the invention may be more fully understood and appreciated, I will now take up a detailed description thereof in which the same will be more comprehensively set forth, with reference being had to the accompanying drawing forming a part hereof, in which.

Like characters of reference designate like parts throughout the several views of the drawing.

Figure 1:
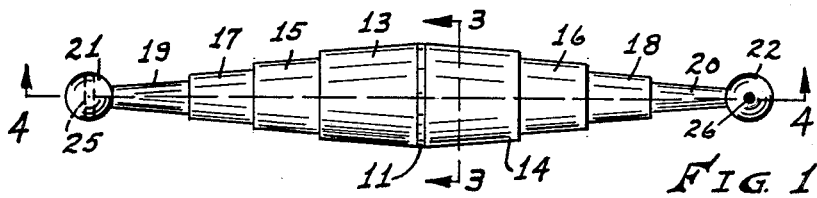
FIGURE 1 is a detail elevation of the collapsible fishing float forming the subject of the invention, and with the same being shown in extended and operative condition.
Figure 2:
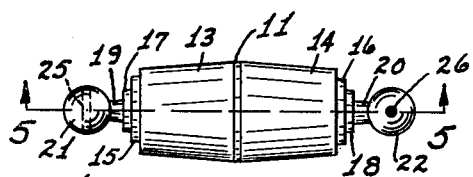
FIGURE 2 is an elevation of the float, with the same being shown in collapsed condition.
Figure 3:
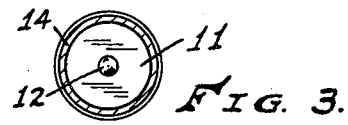
FIGURE 3 is a detail cross sectional view through the float, as taken on line 3—3 of FIGURE 1.

Referring now to the drawing in detail, numerals 11 designate the central member which is disc-shaped and has a centrally located pin or projection 12 formed on each face thereof. One face of the central member has the larger end of a frusto-conical member 13 welded or otherwise suitably secured thereto while the opposite side of member 11 has a similar frusto-conical member 14 secured thereto. Frusto-conical members 15 and 16 fit into respective members 13 and 14, as more clearly shown in FIGURE 4, with the larger diameter inner ends of members 15 and 16 being of such size to prevent outward disengagement of the members 15 and 16 from the respective members 13 and 14.

Figure 4:
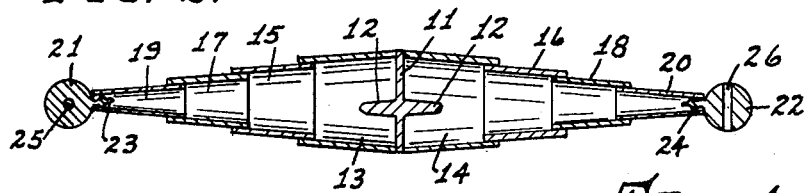
FIGURE 4 is a longitudinal section through the float in its extended condition, taken on line 4—4 of FIGURE 1.
Figure 5:
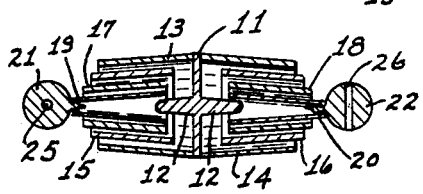
FIGURE 5 is a detail longitudinal section, taken on line 5—5 of FIGURE 2.
Figure 7:
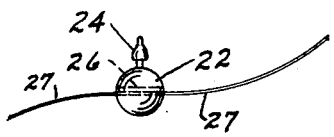
FIGURE 7 is a detail elevational view of one of the plugs or closure members of the device and showing the same on a fishing line.
Figure 6:
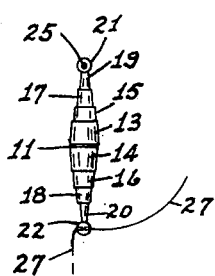
FIGURE 6 is an elevational view showing the float in operative condition with a fishing line, a hook, and a sinker attached thereto.

Frusto-conical members 17 and 18 are fitted into the respective companion members 15 and 16, and the frusto-conical members 19 and 20 likewise fit into their adjacent respective companion members 17 and 18, all as shown in FIGURES 1 and 4. Member 19 is provided with a closure member 21 removably secured in the outer end thereof. Also, member 20 has a closure member 22 removably secured therein. The closure members 21 and 22 are alike and a common description will suffice. Referring to FIGURE 7, the closure member 22 has an engaging bulbous tip 24 formed thereon, with the bulbous tip being adapted to engage the outer end of the member 20 which is of slightly less inside diameter than the outer diameter of the bulbous tip 24 as shown in FIGURES 4 and 5. The tip 24 is of such size that the same can be pressed into the outer end of member 20, with the same providing a snug fit which is airtight and water tight. An aperture 26 is provided through the member 22 and provides for the reception therethrough of the fishing line 27, as shown in FIGURE 7, and with there being a weight or sinker 28 secured to the line 27 between the member 22 and the fishing hook 29. The opposite portion of the line 27 extends to a fishing rod (not shown) and to a reel (not shown) in the conventional manner. The line 27 is extended through the member 22, as shown in FIGURE 7 to permit slippage of the line through the aperture 26.

The pins or projections 12 provide means of locating the members 19 and 20 when the float is collapsed, as shown in FIGURE 5.

The closure members 21 and 22 are easily removable with relation to their respective frusto-conical members 19 and 20. When it is desired to detach the fishing line from the float, it is only necessary to remove the closure member from its respective frusto-conical member without detaching the line from its closure member. Should it be desired to use a different float with the fishing line, it is only necessary to insert the closure member into the end member of the desired float.

The detachability of the closure members readily lends itself to the use of various sizes of floats and with the floats possibly being of different colors.

I desire that it be understood that I am not to be limited to the exact arrangement of the parts herein shown and described but that minor changes may be made therein, insofar as the changes may fall within the scope of the appended claims.

Having now shown and described the invention, what I claim and desire to secure by Letters Patent of the United States, is:

1. In a collapsible fishing float, the combination of a pair of oppositely disposed frusto-conical collapsible and extendable assemblies each of said assemblies being composed of a plurality of frusto-conical members of graduated sizes with each member being slidably interfitted with the adjacent member of the assembly, a disc-shaped central member having opposed sides and disposed between the assemblies and secured to both assemblies, a closure member for each of said assemblies having a bulbous tip formed thereon, with the bulbous tip being adapted to be snapped into the outermost end of each of the assemblies which has an aperture formed therein of slightly less diameter than the bulbous tip of the closure member and providing an airtight and watertight closure therefor, with the closure member having an aperture formed therethrough providing a means for receiving a fishing line, and with the extension of the frusto-conical assemblies providing air compartments therein.

2. A collapsible fishing float comprising a pair of oppositely-disposed air chambers, each air chamber being composed of a series of graduated frusto-conical members with each being interfitted with adjacent members, a disc-shaped central member having opposed faces, each series of frusto-conical members being secured to opposed faces of said disc-shaped central member and with each of the series of frusto-conical members being extensible and collapsible, a removable closure member for each of said air chambers having a bulbous engaging tip, with the tip of each removable closure member being adapted to snap into its respective endmost frusto-conical member and closing the outermost end of the outermost frusto-conical member of each air chamber which has an aperture of slightly less diameter than the bulbous tip of the closure member, and with each of the removable closure members being provided with a fishing line-engaging aperture.

References Cited in the file of this patent

UNITED STATES PATENTS

| | | |
|---|---|---|
| 335,631 | Root | Feb. 9, 1886 |
| 1,202,558 | Poling | Oct. 24, 1916 |
| 2,526,023 | Greenberg | Oct. 17, 1950 |
| 2,787,484 | Macy | Apr. 2, 1957 |

FOREIGN PATENTS

| | | |
|---|---|---|
| 21,622 | Great Britain | Dec. 10, 1891 |
| 139,565 | Great Britain | Mar. 11, 1920 |
| 417,604 | Great Britain | Oct. 8, 1934 |
| 494,505 | Italy | May 26, 1954 |